United States Patent [19]

Sauder

[11] Patent Number: 5,137,319
[45] Date of Patent: Aug. 11, 1992

[54] FISHING ROD AND REEL HOLDER

[76] Inventor: Loren Sauder, 2-1779-21, Archbold, Ohio 43502

[21] Appl. No.: 631,231

[22] Filed: Dec. 20, 1990

[51] Int. Cl.⁵ .................. A01K 97/10; B65D 71/00
[52] U.S. Cl. ........................ 294/159; 206/315.11; 211/70.8; 294/143
[58] Field of Search ................. 294/141–143, 294/146–148, 159–163, 165–169; 43/21.2; 206/315.1–315.3, 315.6, 315.11, 443; 211/62, 68, 70.2, 70.5, 70.8; 224/922; 248/316.1, 518; 280/DIG. 6

[56] References Cited

U.S. PATENT DOCUMENTS

| 699,391 | 5/1902 | Johnson | 206/315.2 X |
| 722,546 | 3/1903 | Werle | 211/62 |
| 1,903,798 | 4/1933 | Turner . | |
| 2,055,842 | 9/1936 | Haislip . | |
| 2,064,542 | 12/1936 | Jones | 206/315.6 X |
| 2,411,965 | 12/1946 | Hartung | 280/DIG. 6 X |
| 2,419,175 | 4/1947 | Spohrer | 211/70.2 |
| 2,533,541 | 12/1950 | Warring | 280/DIG. 6 X |
| 2,590,154 | 3/1952 | Burns | 294/146 X |
| 2,595,746 | 5/1952 | Zinn | 206/315.11 X |
| 2,635,893 | 4/1953 | Johnson | 211/70.2 X |
| 2,749,645 | 6/1956 | McKern . | |
| 3,139,132 | 6/1964 | Shiller | 206/315.6 |
| 3,167,284 | 1/1965 | Lynch . | |
| 3,406,930 | 10/1968 | Seiler . | |
| 3,674,190 | 7/1972 | Wright . | |
| 4,003,612 | 1/1977 | Munsell | 294/146 X |
| 4,181,167 | 1/1980 | Ret | 206/315.6 |
| 4,311,262 | 1/1982 | Morin . | |
| 4,523,403 | 6/1985 | Ivy et al. | 43/21.2 X |
| 4,628,628 | 12/1986 | Burgin et al. | 43/21.2 X |
| 4,696,122 | 9/1987 | Van Der Zyl | 294/143 X |
| 4,779,914 | 10/1988 | Friedline | 294/146 X |

Primary Examiner—Johnny D. Cherry
Attorney, Agent, or Firm—Emch, Schaffer, Schaub & Porcello Co.

[57] ABSTRACT

A fishing rod and reel holder is disclosed. The holder includes a base defining a plurality of sockets for receiving the butt ends of fishing rods. A post extends from the base and an upper end unit is mounted on the post in an opposed relationship to the base. The upper end unit includes a resilient layer which defines a plurality of radial slots for receiving the fishing rods.

2 Claims, 2 Drawing Sheets

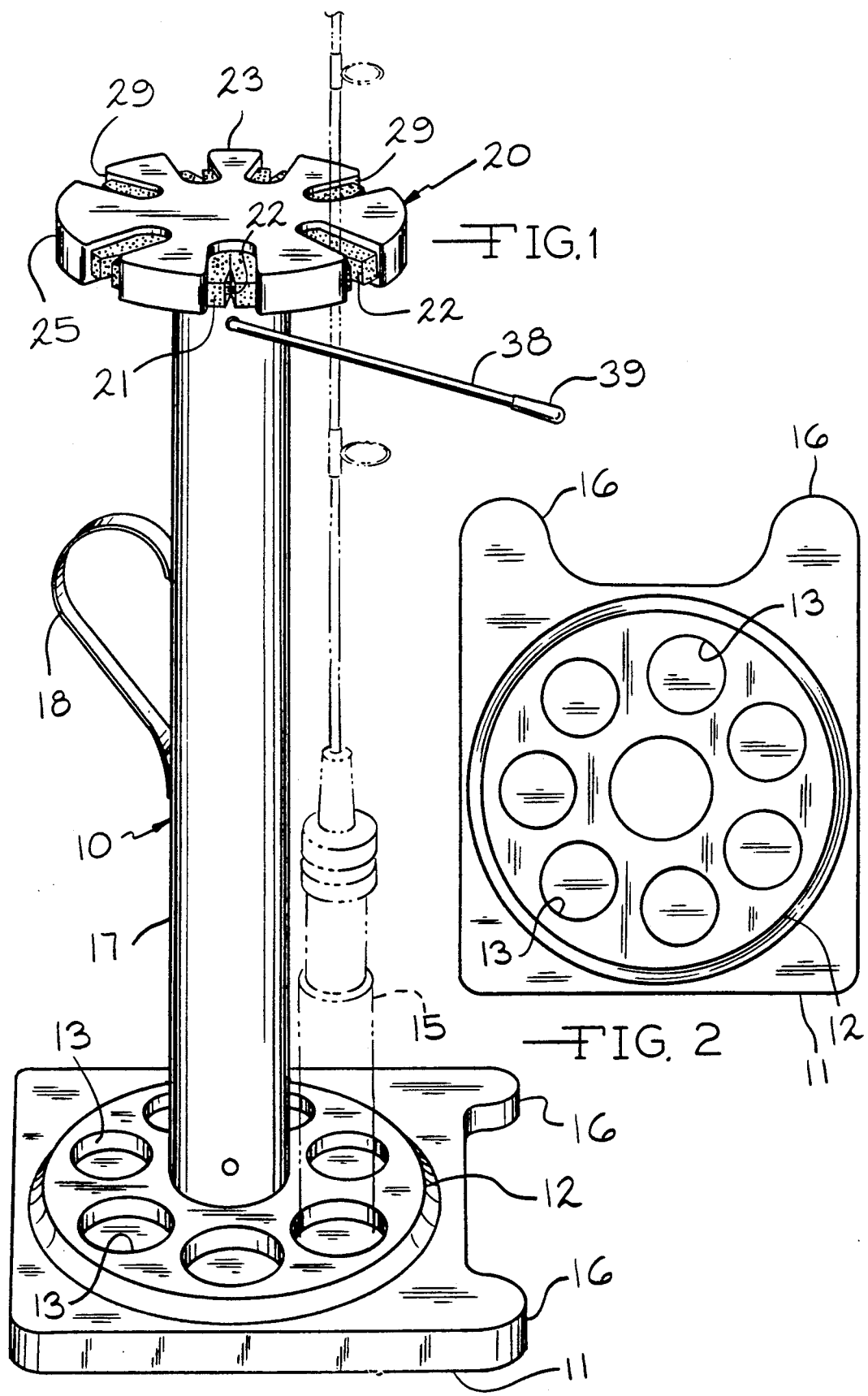

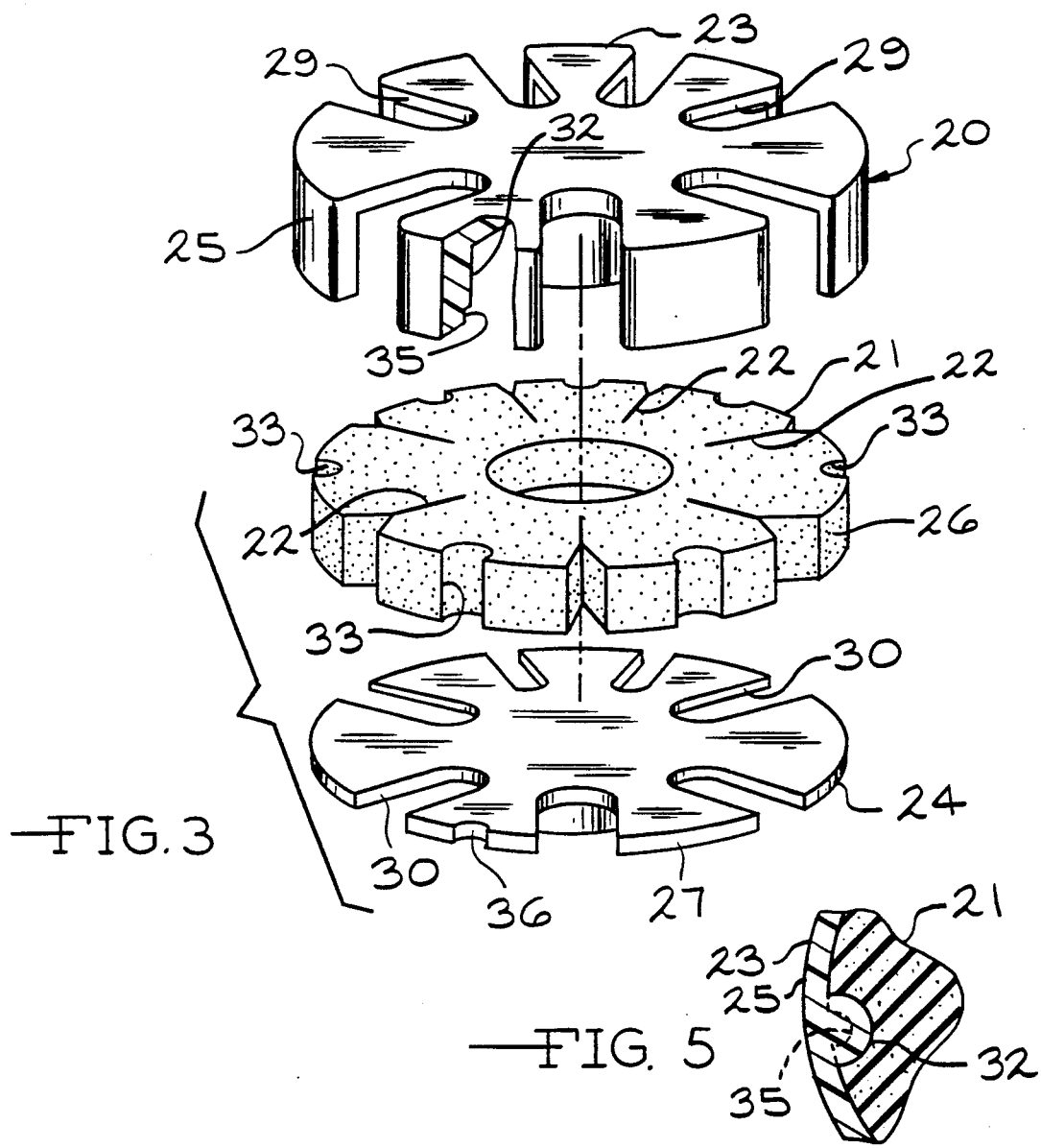
FIG. 3
FIG. 5
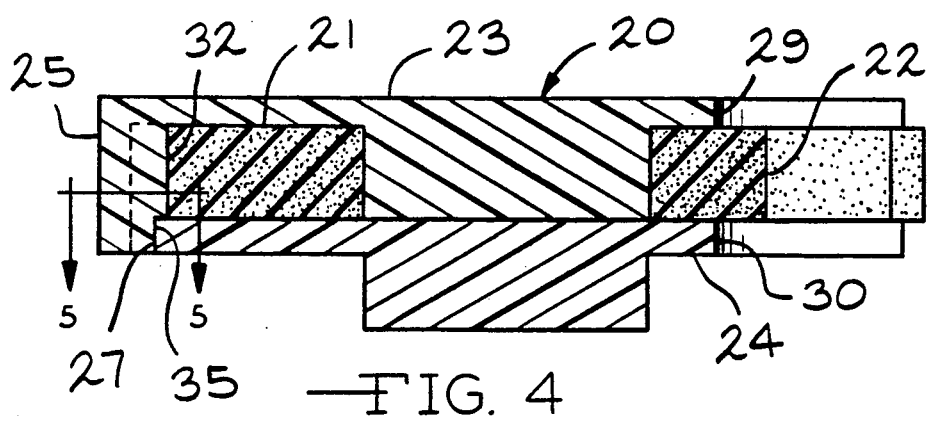
FIG. 4

FISHING ROD AND REEL HOLDER

BACKGROUND OF THE INVENTION

When a person is attempting to move several fishing rods from one location to another, that person in the past has had relatively few options. The most common practice is to remove the reels from the rods and to break down and store the rods in individual carrying cases. Another alternative is simply to leave the reels on the rods and to carry the rods together or stack them together. The disadvantage of the latter approach is the chance that someone will step on the rods or that the rods and reels will be damaged by striking one another.

Other attempts have been made in the past to provide fishing rod and reel holders. One example of a prior art rod and reel holder is shown in U.S. Pat. No. 4,311,262.

The present invention is an improvement in a rod and reel holder.

SUMMARY OF THE INVENTION

A fishing rod and reel holder, according to the present invention, includes a base which defines a plurality of sockets for receiving the butt ends of fishing rods. A post extends outwardly from the base and an upper end unit is positioned on the post in an opposed relationship with the base. The upper end unit includes a resilient layer which defines a plurality of radial slots for receiving the fishing rods which have their lower butt ends positioned in the sockets defined by the base.

DESCRIPTION OF THE DRAWINGS

FIG. 1 is a perspective view of a fishing rod and reel holder, according to the present invention, showing a portion of a fishing rod in dashed lines;

FIG. 2 is a top view of the base of the fishing rod and reel holder, shown in FIG. 1;

FIG. 3 is an exploded view of the upper end unit of the fishing rod and reel holder, shown in FIG. 1;

FIG. 4 is a cross-sectional view of the upper end unit; and

FIG. 5 is a fragmentary, sectional view taken along the line 5—5 of FIG. 4.

DESCRIPTION OF THE PREFERRED EMBODIMENT

A fishing rod and reel holder, according to the present invention, is generally indicated in FIG. 1 by the reference number 10. The holder 10 includes a base 11. The base 11 includes an elevated circular portion 12. The base 11 defines a plurality of spaced sockets 13 which receive the butt ends of fishing rods to be carried or supported, such as the fishing rod 15 indicated in FIG. 1. The base 11 also includes a pair of spaced support feet 16. The base 11 may be constructed of differing materials including various plastics and woods.

A post 17 extends outwardly from the base 11. In the present embodiment, the post 17 is tubular and is constructed of a plastic material. However, the post may be constructed from varying materials and have varying shapes. A carrying handle 18 is mounted on the post 17.

An upper end unit 20 is mounted on the post 17 in an opposed and opposite relationship with the base 11. The upper end unit 20 includes a circular resilient layer 21 which defines a plurality of radial slots 22 for receiving the fishing rods such as the fishing rod 15, shown in FIG. 1.

The resilient layer 21 may be constructed of varying materials, but is preferably constructed of a foamed plastic material such as a foamed polyurethane.

Referring to FIGS. 3-5, the upper end unit 20, in the present embodiment, includes a generally circular upper section 23 and a generally circular lower section 24. The upper and lower sections 23 and 24 may be constructed of varying materials including various plastics and woods. The resilient layer 21 is positioned between the upper section 23 and the lower section 24. The upper section 23 includes an outer skirt 25 which extends downwardly over a portion of the circumference 26 of the resilient layer 21 and also over the outer edge 27 of the lower section 24.

Referring to FIG. 3, the upper section 23 defines a series of radial recesses 29, while the lower section 24 defines a plurality of radial recesses 30. When the upper end unit 20 is assembled, as shown in FIG. 4, the radial recesses 29 and 30 together with the radial slots 22 in the resilient layer 21 are all aligned.

Retaining means, which in the present embodiment comprise a spaced plurality of semi-circular vertical retaining members 32, are defined at spaced locations on the inside of the upper section 23 of the upper end unit 20. The resilient layer 21 defines a plurality of complementary radially spaced openings 33 on its periphery. At least one of the members 32 includes a lower alignment post 35 (see FIG. 4) which extends below the resilient layer 21 and is received in a recess 36 defined in the periphery of the lower section 24, as shown in FIG. 3.

The vertical members 32 on the upper section 23 are received in the openings 33 defined in the periphery of the resilient layer 21 to retain the slots 22 in their correct alignment with the radial recesses 29 of the upper end unit 20. In the present embodiment, the vertical members 32 also act as spacers to correctly space the lower section 24 relative to the upper section 23.

The members 32 and their cooperating openings 33 also retard rotation of the upper section 23 relative to the resilient layer 21.

In a similar manner, the alignment post 35 which extends downwardly from the upper section 23 and is received in the recess 36 aligns and retains the lower section 24 relative to the upper section 23 and also with respect to the intermediate resilient layer 21.

Referring to FIG. 1, in the present embodiment, a rest arm 38 having an outer tip 39 is pivotally mounted adjacent the upper end of the post 17. The rest arm 38 is pivotally movable between an inoperative position (not shown) where the arm is parallel to the post 17 and an operative position, as shown in FIG. 1.

When the rest arm 38 is in the operative position, the tip 39 together with the support feet 16 of the base 11 are all cooperating elements and provide a tripod support to elevate the post 17 and the fishing rods, for example the fishing rod 15, above the support surface so that the rod tips do not engage the support surface and become damaged. When not in use, the rest arm 38 is pivoted to the inoperative position.

Many revisions may be made to the fishing rod and reel holder disclosed above without departing from the scope of the invention and from the scope of the following claims.

I claim:

1. A fishing rod and reel holder comprising, in combination, a base defining a plurality of sockets for receiving the butt ends of fishing rods, a post extending outwardly from said base and an upper end unit on said post, said upper end unit defining a plurality of radial slots for receiving the fishing rods, said upper end unit including a resilient layer which defines said plurality of radial slots and means for retarding rotation of said resilient layer, said retarding means comprising a plurality of radially spaced vertical members on said upper end unit and a plurality of complementary radially spaced openings defined by said resilient layer, said openings receiving said vertical members.

2. A fishing rod and reel holder comprising, in combination, a base defining a plurality of sockets for receiving the butt ends of fishing rods, a post extending outwardly from said base and an upper end unit on said post, said upper end unit defining a plurality of radial slots for receiving the fishing rods, said upper end unit including a resilient layer which defines said plurality of radial slots, said upper end unit includes a generally circular upper section and a complementary generally circular lower section, said resilient layer positioned between said upper section and said lower section, alignment means for retaining said upper section, said resilient layer and said lower section in correct alignment, said alignment means includes at least one alignment post extending from said upper section, said lower section defining a recess, said recess receiving said alignment post.

* * * * *